(12) United States Patent
Sandgren et al.

(10) Patent No.: US 11,429,998 B1
(45) Date of Patent: Aug. 30, 2022

(54) DEEP-LINKING AUTHENTICATION SYSTEM AND RELATED METHODS

(71) Applicant: Inmar Clearing, Inc., Winston-Salem, NC (US)

(72) Inventors: Jeffrey T. Sandgren, Kernersville, NC (US); Amy LaBier Maynard, St. Petersburg, FL (US); Richard Polhemus, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/226,849

(22) Filed: Apr. 9, 2021

(51) Int. Cl.
  *G06Q 30/00* (2012.01)
  *G06Q 30/02* (2012.01)
  *H04L 9/32* (2006.01)

(52) U.S. Cl.
  CPC ..... *G06Q 30/0225* (2013.01); *G06Q 30/0235* (2013.01); *G06Q 30/0236* (2013.01); *H04L 9/3213* (2013.01)

(58) Field of Classification Search
  None
  See application file for complete search history.

(56) References Cited

U.S. PATENT DOCUMENTS

| | | | |
|---|---|---|---|
| 9,734,526 B2 | 8/2017 | Isaacson et al. | |
| 10,546,327 B2 | 1/2020 | Lakes et al. | |
| 2014/0229898 A1 | 8/2014 | Terwedo | |
| 2015/0161673 A1* | 6/2015 | Guo | G06Q 30/0269 705/14.66 |
| 2016/0292728 A1* | 10/2016 | Kang | G06F 3/0485 |
| 2021/0209196 A1* | 7/2021 | Arana | G06F 21/10 |

\* cited by examiner

*Primary Examiner* — Matthew T Sittner
(74) *Attorney, Agent, or Firm* — Allen, Dyer, Doppelt + Gilchrist, P.A.

(57) ABSTRACT

A content origination server may generate content having a stored content identifier associated therewith, and a content display server may display the content. A deep-link server may obtain the stored content identifier and generate an authorization token based upon the stored content identifier. The content origination server may generate a deep-link to the content. The deep-link may have associated therewith the stored content identifier and the authorization token. The content display server may communicate a request including a content identifier and a link authorization token, to the server. The deep-link server may determine whether the obtained link authorization token is valid based upon the generated authorization token and whether the identifiers match, and when so, cause the content display server to modify a layout of content otherwise, cause the content display server to display the content without modification to the layout of content.

24 Claims, 6 Drawing Sheets

DEEP-LINKING AUTHENTICATION SYSTEM AND RELATED METHODS

TECHNICAL FIELD

The present invention relates to the field of linking content, and more particularly, to deep-linking of content and related methods.

BACKGROUND

Deep-linking is a practice in which a consumer clicks through to a retailer's website in search of a product or offer which was presented to them on an external media property, email, or text message. When the consumer arrives at the click-through site, which may be referred to as the targeted property, the consumer may find at that site, the products or offerings which they viewed off site prior to clicking through, prominently presented (e.g., at the top of the web page or in a special pop-out above the web page) without having to search through a multiple of similarly presented products or offerings. A party that knows or discovers, for example, the uniform resource locator (URL) pattern can invoke the deep-linking behavior on the targeted property without permission from or control by the targeted property's host or sponsor. In some instances, it may be desirable to limit access by unauthorized parties to deep links.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A deep-linking authentication system may include a content origination server configured to generate targeted content having a stored content identifier associated therewith. The deep-linking system may also include a content display server configured to display the targeted content. A deep-link server may be configured to obtain the stored content identifier from the content origination server, generate an authorization token based upon the stored content identifier, and communicate the authorization token to the content origination server.

The content origination server may be configured to generate a deep-link to the targeted content on the content display server. The deep-link may have associated therewith the stored content identifier and the authorization token. The content display server may be configured to, based upon a request to display the targeted content via the deep-link, communicate a targeted content display request including a content identifier and a link authorization token, to the deep-link server.

The deep-link server may be configured to obtain the content identifier and the link authorization token from the content display server, and determine whether the link authorization token is valid based upon the generated authorization token and determine whether the received content identifier matches the stored content identifier. When so, the deep-link server may cause the content display server to modify a layout of content for display so that targeted content is displayed above other content, otherwise, cause the content display server to display the content without modification to the layout of content.

The targeted content may include a digital promotion, and the content identifier may include a digital promotion identifier. The targeted content may be associated with a given brand, and the digital promotion may be redeemable toward purchase of a product of the given brand.

The targeted content may be in the form of one of an email and short-message-service (SMS) message, for example. The deep-link server may be configured to, when the link authorization token is valid and the received content identifier matches the stored content identifier, cause the content display server to modify a layout of content for display so that targeted content is displayed on top of other content, for example.

The authorization token may have a valid time associated therewith. The deep-link server may be configured to determine the link authorization token is valid by determining whether the valid time has expired, for example. The deep-link server may be configured to measure the valid time from the generation of the authorization token, for example.

The deep-link may have a click-through pattern associated therewith. The content origination server may be configured to embed the stored content identifier and the authorization token within the click-through pattern, for example.

The deep-link server may be configured to operate an application programming interface (API). The content display server may be configured to communicate the targeted content display request to the deep-link server by appending the content identifier and the link authorization token to a call to the API, for example.

A method aspect is directed to a method of deep-linking for a deep-linking authentication system that includes a content origination server configured to generate targeted content having a stored content identifier associated therewith, and a content display server configured to display the targeted content. The method may include using a deep-link server to obtain the stored content identifier from the content origination server, generate an authorization token based upon the stored content identifier, and communicate the authorization token to the content origination server so that the content origination server generates a deep-link to the targeted content on the content display server. The deep-link may have associated therewith the stored content identifier and the authorization token. The method may also include using the deep-link server to obtain a content identifier and a link authorization token from the content display server based upon a request to display the targeted content via the deep-link. The request to display the targeted content via the deep-link may include the stored content identifier and the link authorization token. The deep-link server may be configured to determine whether the authorization token is valid based upon the generated authorization token and determine whether the received content identifier matches the stored content identifier, and when so, cause the content display server to modify a layout of content for display so that targeted content is displayed above other content, otherwise, cause the content display server to display the content without modification to the layout of content.

A computer readable medium aspect is directed to a non-transitory computer readable medium for deep-linking in a deep-linking authentication system that includes a content origination server configured to generate targeted content having a stored content identifier associated therewith, and a content display server configured to display the targeted content. The non-transitory computer readable medium may include computer executable instructions that when executed by a processor of a deep-link server of the deep-linking authentication system cause the processor to perform operations. The operations may include obtaining the stored content identifier from the content origination server, and generating an authorization token based upon the stored content identifier. The operations may also include communicating the authorization token to the content origination server so that the content origination server generates a deep-link to the targeted content on the content display server. The deep-link may have associated therewith the stored content identifier and the authorization token. The operations may also include obtaining a content identifier and a link authorization token from the content display server based upon a request to display the targeted content via the deep-link. The request to display the targeted content via the deep-link may include the content identifier and the link authorization token. The operations may also include determining whether the authorization token is valid based upon the generated authorization token and determining whether the received content identifier matches the stored content identifier, and when so, causing the content display server to modify a layout of content for display so that targeted content is displayed above other content, otherwise, causing the content display server to display the content without modification to the layout of content.

BRIEF DESCRIPTION OF THE DRAWINGS

FIG. 5b is a continuation of the flow chart of FIG. 5a.

DETAILED DESCRIPTION

Figure 1:
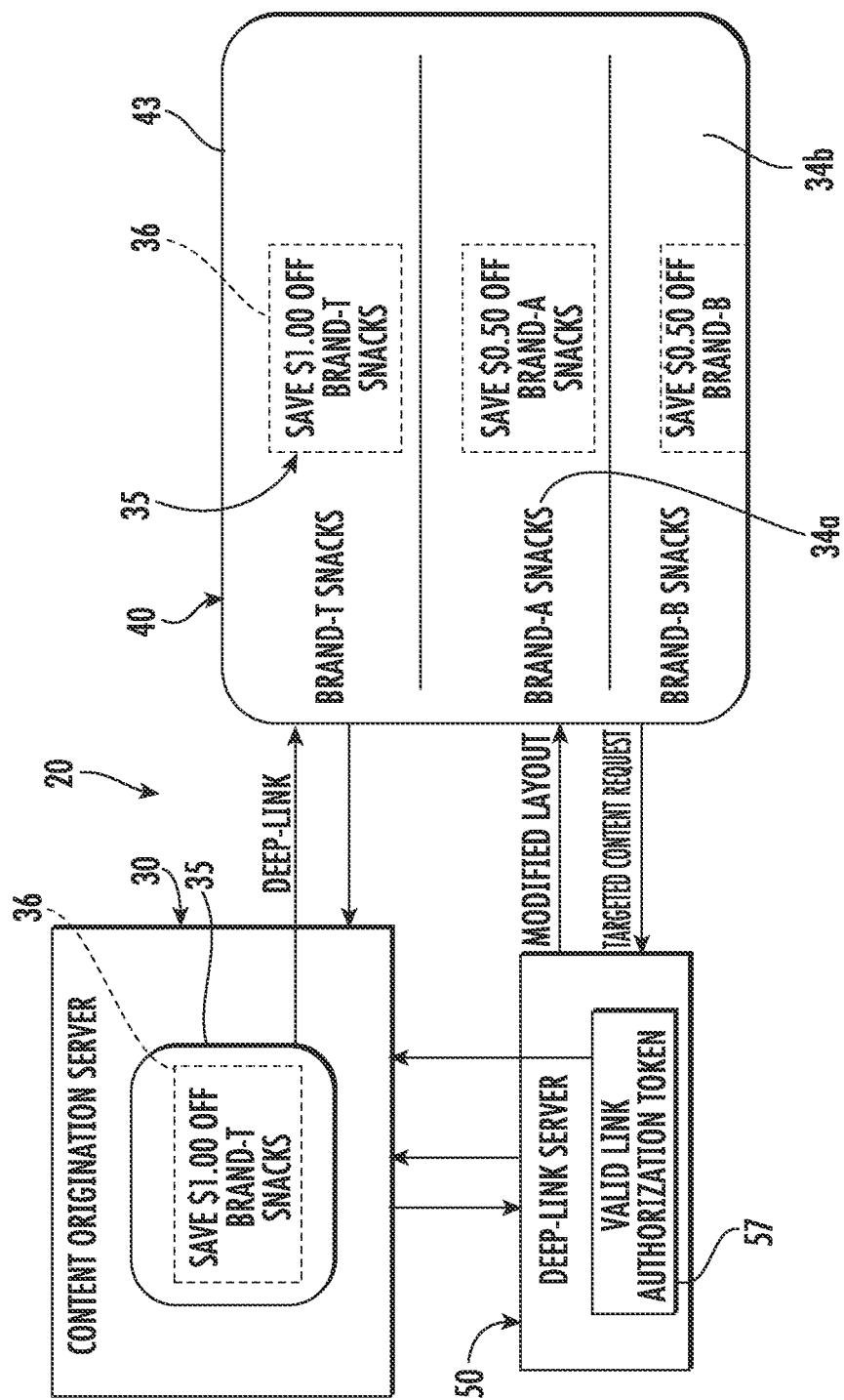
FIG. 1 is a schematic diagram of a deep-linking authentication system in accordance with an embodiment.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a deep-linking authentication system 20 includes a content origination server 30. The content origination server 30, which may include a processor 31 and an associated memory 32 cooperating to perform the operations described herein (FIG. 4), may be associated with or operated by a manufacturer or consumer product goods (CPG) provider, generates targeted content 35. The targeted content 35 may be in the form of an email, short-messaging-service (SMS) message, for example. The targeted content 35 may include a digital promotion 36, which may in the form of a digital coupon. For example, the targeted content 35 may include advertisement information with respect to a given product or be associated with a given brand, and the digital coupon 36 may be applicable to or redeemable toward one or more of the products of the given brand. The content origination server 30 has a stored content identifier 38 associated therewith, for example, stored in the memory 32. The stored content identifier 38 may be unique to the targeted content 35.

The content origination server 30 may generate multiple items of targeted content 35. Each item of targeted content 35 may have a unique stored identifier 38 associated therewith, which may be stored in the memory 32.

Figure 4:
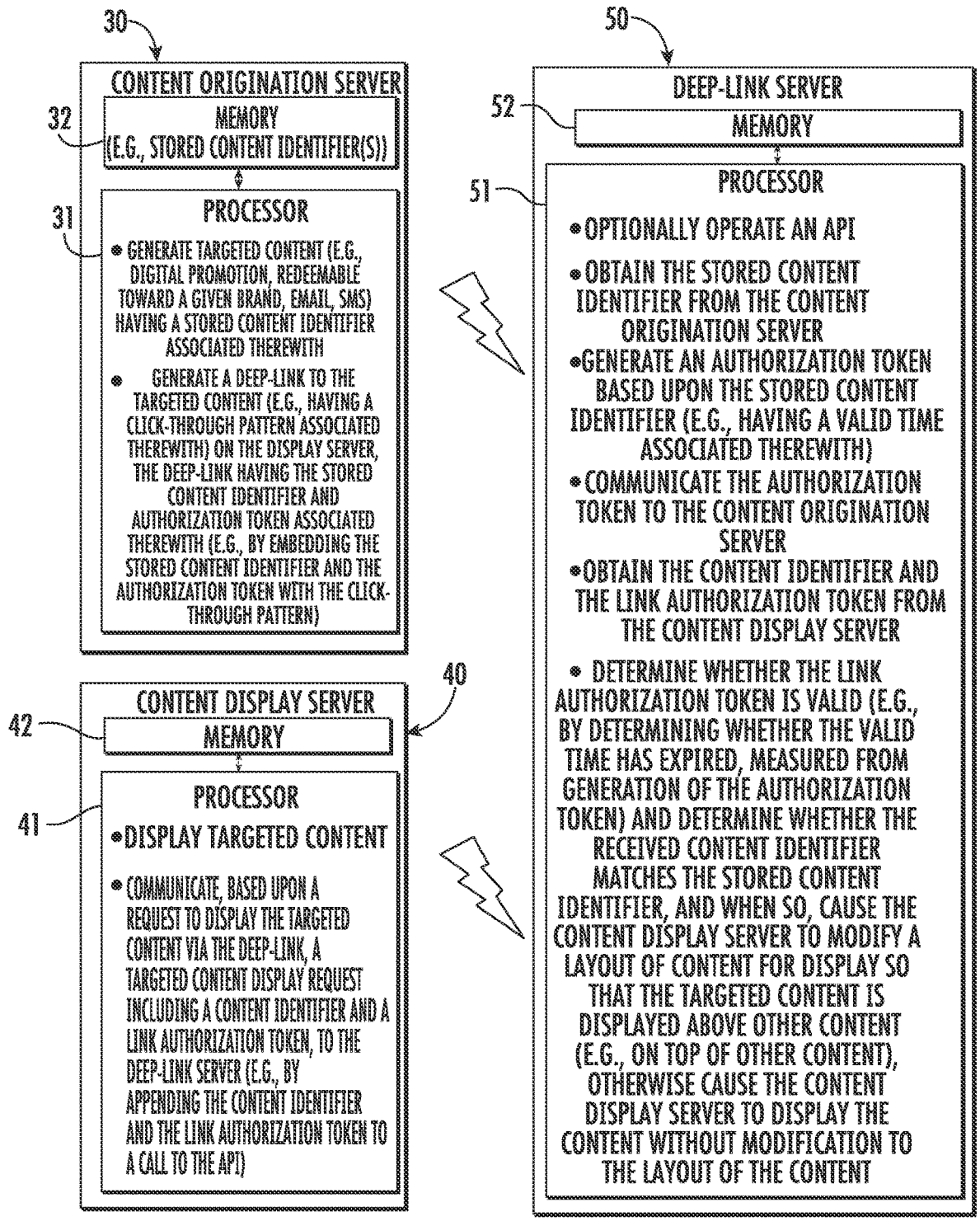
FIG. 4 is another more detailed schematic block diagram of a deep-linking authentication system of FIG. 1.

The deep-linking authentication system 20 also includes a content display server 40 that displays the targeted content 35. The content display server 40 also includes a processor 41 and an associated memory 42 that cooperate to perform the operations of the content display server described herein (FIG. 4). The content display server 40 may conceptually be considered a web server or web hosting server, for example.

The deep-linking authentication system 20 also includes a deep-link server 50. The deep-link server 50 includes a processor 51 and an associated memory 52 that cooperate to perform the operations described herein (FIG. 4). It should be appreciated that while operations of the deep-link server 50 are described herein, the operations are performed based upon cooperation between the processor 51 and the associated memory 52.

Figure 5A:
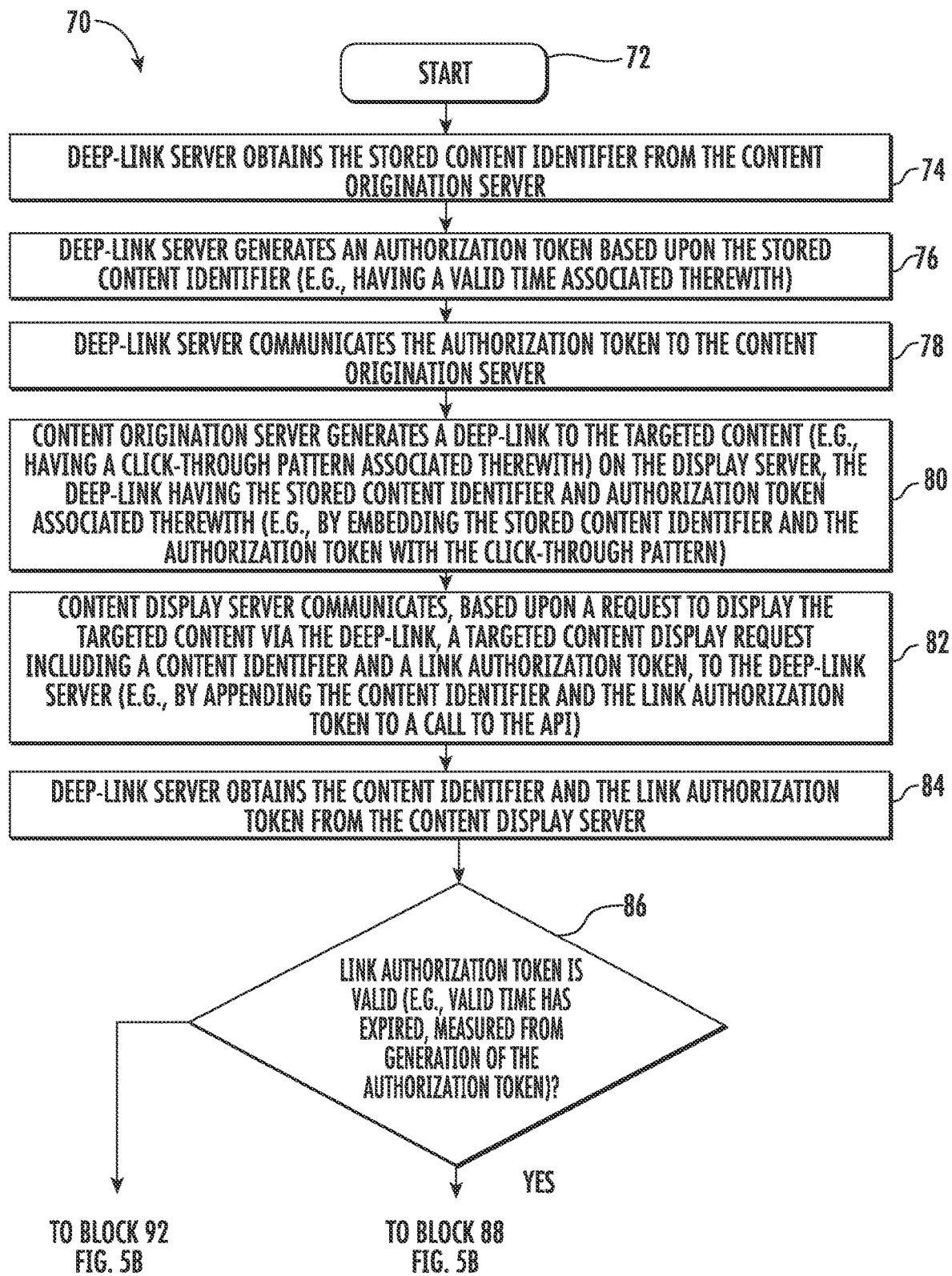
FIG. 5a is a flow chart of operation of the deep-linking authentication system of FIG. 1.
Figure 5B:
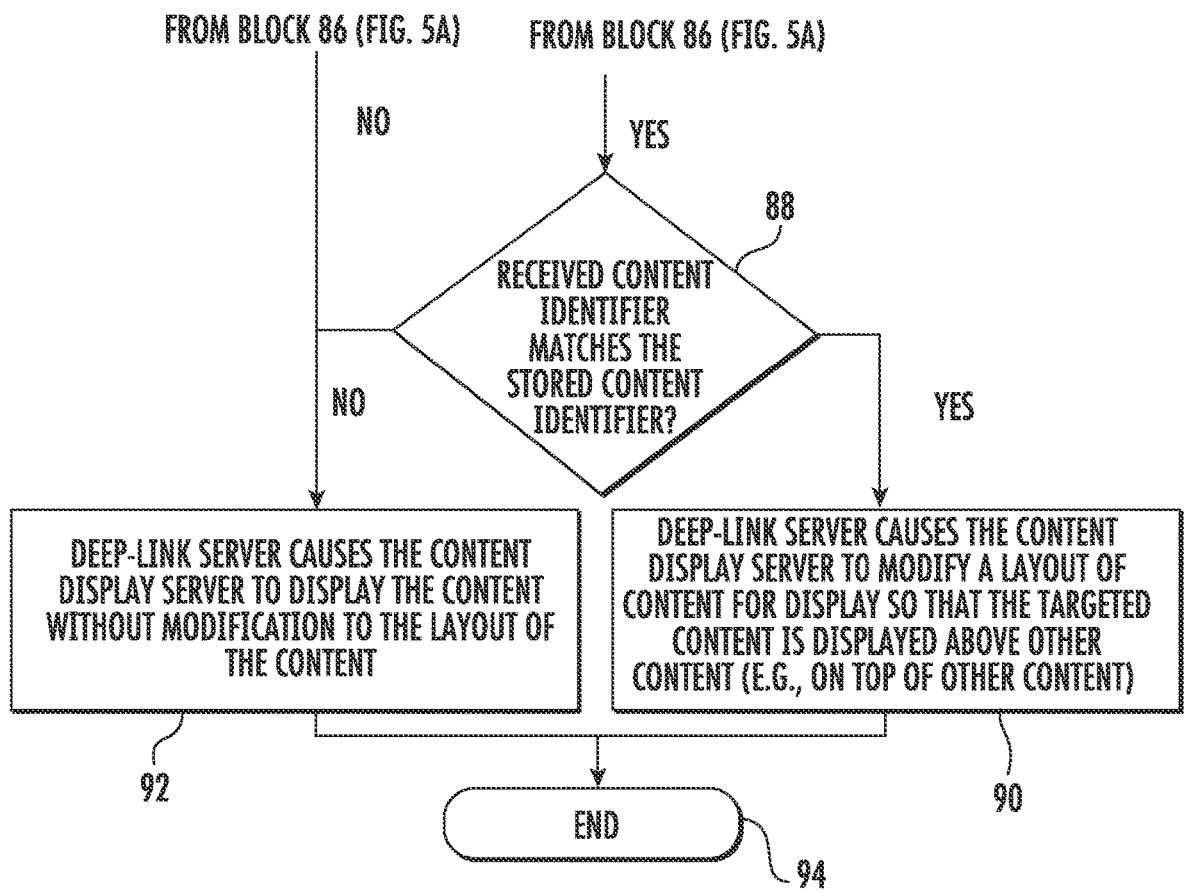

Referring now to the flowchart 70 in FIGS. 5a and 5b, beginning at Block 72, operations of authenticating a deep-link will now be described. The deep-link server 50 obtains the stored content identifier 38 from the content origination server 30 (Block 74). The deep-link server 50, at Block 76, generates an authorization token 54 based upon the stored content identifier 38. For example, the manufacturer or consumer product goods (CPG) provider, or their marketing agent may register for a deep-link authentication code, (i.e., the authorization token 54) that is associated with their targeted content 35. In an exemplary implementation example, the targeted content 35 may be a digital coupon for $1.00 Off Brand-T Snacks (FIG. 1).

The authorization token 54 has a valid time associated therewith. The authorization token 54 may be valid for a valid time period from the time of generation. For example, the authorization token 54 may be valid for a few hours or days from the time of generation. Of course, the authorization token 54 may be valid for other time periods, or may not have a valid time period. The deep-link server 50, at Block 78, communicates the authorization token 54 to the content origination server 30.

The content origination server 30 generates a deep-link 55 to the targeted content 35 on the content display server 40 (Block 80). The deep-link 55 has associated therewith the stored content identifier 38 and the authorization token 54, for example, based upon registration by the manufacturer or consumer product goods (CPG) provider, as described above. More particularly, the deep-link 55 may have a click-through pattern 56 associated therewith. The content origination server 30 may embed the stored content identifier 38 (e.g., digital promotion 36 or coupon identifier) and the authorization token 54 into or within the click-through pattern 56 to the content display server 40. The click-through pattern 56 may be a URL, for example, that is linked to the targeted content 35 via deep-linking.

The content display server 40, at Block 82, based upon a request to display the targeted content via the deep-link 47 (e.g., from an end user), communicates a targeted content display request 48 including a content identifier 45 and a link authorization token 58, to the deep-link server 50. The content display server 40 may communicate the targeted content display request 48 by making a one-time modification to "ingest" the content identifier 45 and the link authorization token 58 and append them to an application programming interface (API) call to the targeted content 35. More particularly, the deep-link server 50 operates an API to accept the request to display the targeted content 47 from the content display server 40.

The deep-link server 50 may obtain the content identifier 45 and the link authorization token 58 from the content display server 40, for example, by way of the API call. The deep-link server 50 determines whether the link authorization token 58 is valid (Block 86) and determines whether the received content identifier 45 matches the stored content identifier 38 (Block 88). With respect to determining whether the link authorization token 58 is valid (Block 86), the deep-link server 50 may determine validity by determining whether the valid time for that particular or matched authorization token, i.e., the generated authorization token 54 has expired. Of course, if the link authorization token 58 does not match a generated authorization token 54, the link authorization token is determined to be invalid.

Alternatively, if the link authorization token 58 matches the generated authorization token 54, and the valid time of the generated authorization token has expired, the authorization token has expired (i.e., the received or link authorization token is invalid). While the determination of whether the link authorization token 58 is valid and whether the received content identifier 45 matches the stored content identifier 38 are illustratively performed serially, those skilled in the art will appreciate that these operations may be performed in parallel or reverse order.

If the deep-link server 50 determines that the link authorization token 58 is valid (Block 86) and the received and stored content identifiers 45, 38 match (Block 88), the deep-link server causes the content display server 40 to modify a layout of the content so that the targeted content 35 (i.e., the content associated with or referenced by the stored content identifier) is displayed, for example, on a display 43 above other content, for example, at the top of webpage and/or above all other content (e.g., products for purchase) (Block 90). With respect to the above implementation example, as the link authorization token 58 is determined to be a valid link authorization token 57, illustratively, the targeted content 35, i.e., the digital coupon for Brand-T Snacks is above other content 34a, 34b, particularly a digital coupon for Brand-A Snacks and Brand-B Snacks, respectively (FIG. 1).

Figure 2:
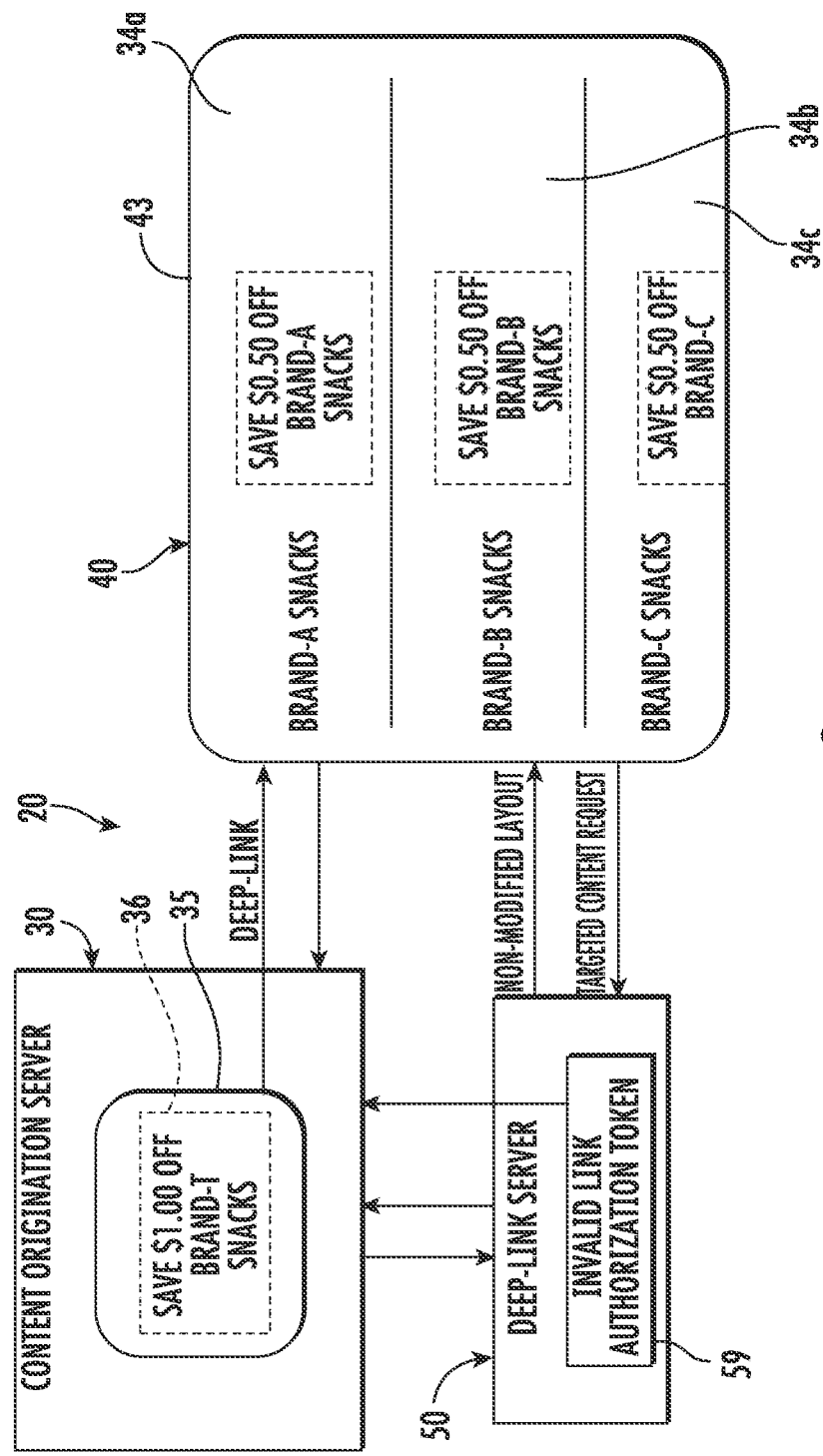
FIG. 2 is another schematic diagram of a deep-linking authentication system in accordance with the embodiment of FIG. 1 shown in a different state.
Figure 3:
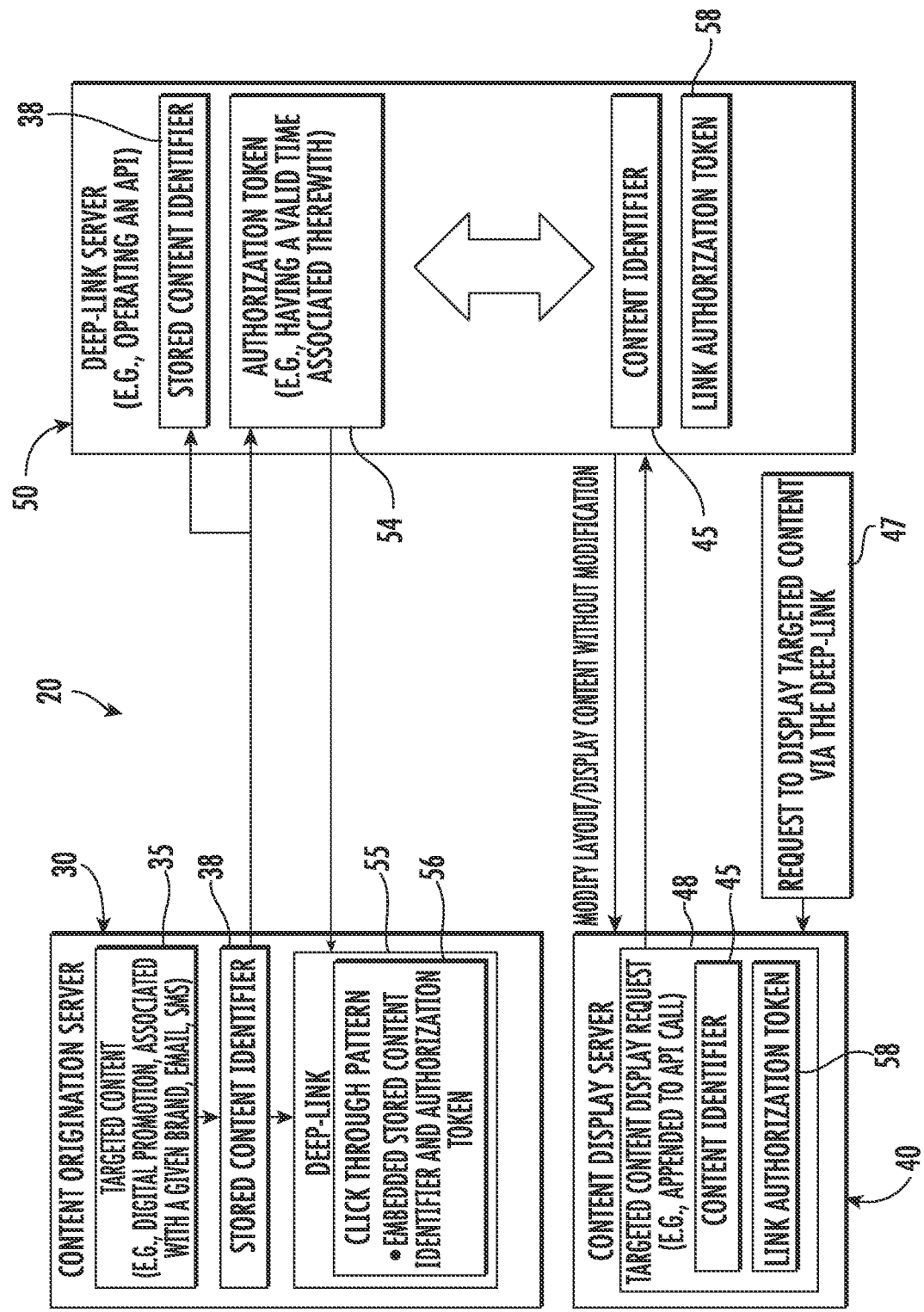
FIG. 3 is a more detailed schematic block diagram of the deep-linking authentication system of FIG. 1.

Otherwise, if the deep-link server 50 determines that the link authorization token 58 is invalid (Block 86) and/or the received and stored content identifiers 45, 38 do not match (Block 88), the deep-link server, at Block 92, causes the content display server 40 to display the content without modification to the layout of content. In other words, a normal response as if no deep-linking request had been made is returned. Based upon the response the content display server 40 displays content (e.g., digital coupons), for example, on the display 43 based on the response from the deep-link server 50. With respect to the above implementation example, as the link authorization token 58 is determined to be an invalid link authorization token 59, illustratively, the targeted content 35, i.e., the digital coupon for Brand-T Snacks is not above other content 34a, 34b, 34c particularly a digital coupon for Brand-A Snacks, Brand-B Snacks, and Brand-C Snacks, respectively (FIG. 2). Operations end at Block 94.

The deep-link server 50 may also provide a user interface to authorize, de-authorize, modify, or discontinue deep-linking services. For example, a registered content provider with targeted content may login to the deep-link server 50 via an interface to authorize, de-authorize, modify, or discontinue the deep-linking services.

As will be appreciated by those skilled in the art, the deep-link server 50 may ensure that the targeted content is de-duplicated from the rest of the response for displaying on the content display server 40. Moreover, by having authentication, sorting, and de-duplications performed by the deep-link server 50, the codebase associated with the targeted content 35 (e.g., the codebase at the content display server 40), may not need to be manipulated. The end-user or shopper experience may thus be to click-through to the content display server 40 with the targeted content 35 featured above other content, for example, on top of the associated webpage. Thus the end-user or shopper may not have to scroll or search for the targeted content 35.

Still further, as will be appreciated by those skilled in the art, current deep-linking approaches that deep-link to websites, for example, retailer's websites, lack any authentication. Thus, any external content originator or provider with record of a website's deep-link URL or click-through pattern can trigger that preferred behavior without monetization to or management or control by the targeted content provider (e.g., content display server, host, marketing agent, etc.). The deep-linking authentication system 20 thus addresses the shortcomings of prior approaches by providing authentication for deep-linking.

While different servers (i.e., the content origination server 30, the content display server 40, and the deep-link server 50) have been described herein as physically separate hardware servers, in some embodiments, the functions of any of the servers may be combined into a single physical server.

A method aspect is directed to a method of deep-linking for a deep-linking authentication system 20 that includes a content origination server 30 configured to generate targeted content 35 having a stored content identifier 38 associated therewith, and a content display server 40 configured to display the targeted content. The method may include using a deep-link server 50 to obtain the stored content identifier 38 from the content origination server 30, generate an authorization token 54 based upon the stored content identifier, and communicate the authorization token to the content origination server so that the content origination server generates a deep-link 55 to the targeted content 35 on the content display server 40. The deep-link 55 may have associated therewith the stored content identifier 38 and the authorization token 54. The method may also include using the deep-link server 50 to obtain a content identifier 45 and a link authorization token 58 from the content display server 40 based upon a request to display the targeted content via the deep-link 47. The request to display the targeted content via the deep-link includes the content identifier 45 and the link authorization token 58. The method includes using the deep-link server 50 to determine whether the link authorization token 58 is valid based upon the generated authorization token 54 and determine whether the received content identifier matches the stored content identifier 38, and when so, cause the content display server to modify a layout of content for display so that targeted content 35 is displayed above other content 34a, 34b, otherwise, cause the content display server to display the content without modification to the layout of content.

A computer readable medium aspect is directed to a non-transitory computer readable medium for deep-linking in a deep-linking authentication system 20 that includes a content origination server 30 configured to generate targeted content 35 having a stored content identifier 38 associated therewith, and a content display server 40 configured to display the targeted content. The non-transitory computer readable medium may include computer executable instructions that when executed by a processor 51 of a deep-link server 50 of the deep-linking authentication system 20 cause the processor to perform operations. The operations may include obtaining the stored content identifier 38 from the content origination server 30, and generating an authorization token 54 based upon the stored content identifier. The operations may also include communicating the authorization token 54 to the content origination server 30 so that the content origination server generates a deep-link 55 to the targeted content 35 on the content display server 40. The deep-link 55 may have associated therewith the stored content identifier 38 and the authorization token 54. The operations may also include obtaining a content identifier 45 and a link authorization token 58 from the content display server 40 based upon a request to display the targeted content via the deep-link 55. The request to display the targeted content via the deep-link 55 includes the content identifier 45 and the link authorization token 58. The operations include and determining whether the authorization token is valid and determine whether the received content identifier matches the stored content identifier 38, and when so, causing the content display server to modify a layout of content for display so that targeted content 35 is displayed above other content 34a, 34b, otherwise, causing the content display server to display the content without modification to the layout of content.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A deep-linking authentication system comprising:
    a content origination server configured to generate targeted content having a stored content identifier associated therewith;
    a content display server configured to cooperate with an end-user device to display the targeted content; and
    a deep-link server configured to
        obtain the stored content identifier from the content origination server,
        generate an authorization token based upon the stored content identifier, and
        communicate the authorization token to the content origination server;
    the content origination server configured to generate a deep-link to the targeted content on the content display server, the deep-link having associated therewith the stored content identifier and the authorization token;
    the content display server configured to, based upon a request to display the targeted content via the deep-link, communicate a targeted content display request including a content identifier and a link authorization token, to the deep-link server;
    the deep-link server configured to
        obtain the content identifier and the link authorization token from the content display server, and
        determine whether the obtained link authorization token is valid based upon the generated authorization token and determine whether the received content identifier matches the stored content identifier, and when so, cause the content display server to modify a layout of content for display so that targeted content is displayed above other content, otherwise, cause the content display server to display the content without a modification to the layout of content,
    the content display server configured to cooperate with the end-user device to display the targeted content with one of the modified layout and without the modification of the layout.

2. The deep-linking authentication system of claim 1 wherein the targeted content comprises a digital promotion and wherein the content identifier comprises a digital promotion identifier.

3. The deep-linking authentication system of claim 2 wherein the targeted content is associated with a given brand; and wherein the digital promotion is redeemable toward purchase of a product of the given brand.

4. The deep-linking authentication system of claim 1 wherein the targeted content is in the form of one of an email and short-message-service (SMS) message.

5. The deep-linking authentication system of claim 1 wherein the deep-link server is configured to, when the link authorization token is valid and the received content identifier matches the stored content identifier, cause the content display server to modify a layout of content for display so that targeted content is displayed on top of other content.

6. The deep-linking authentication system of claim 1 wherein the authorization token has a valid time associated therewith; and wherein the deep-link server is configured to determine the link authorization token is valid by determining whether the valid time has expired.

7. The deep-linking authentication system of claim 6 wherein the deep-link server is configured to measure the valid time from the generation of the authorization token.

8. The deep-linking authentication system of claim 1 wherein the deep-link has a click-through pattern associated therewith; and wherein the content origination server is configured to embed the stored content identifier and the authorization token within the click-through pattern.

9. The deep-linking authentication system of claim 1 wherein the deep-link server is configured to operate an application programming interface (API); and wherein the content display server is configured to communicate the targeted content display request to the deep-link server by appending the content identifier and link authorization token to a call to the API.

10. A deep-link server for a deep-linking authentication system comprising a content origination server configured to generate targeted content having a stored content identifier associated therewith, and a content display server configured to cooperate with an end-user device to display the targeted content, the deep-link server comprising:
a processor and an associated memory configured to
obtain the stored content identifier from the content origination server,
generate an authorization token based upon the stored content identifier,
communicate the authorization token to the content origination server so that the content origination server generates a deep-link to the targeted content on the content display server, the deep-link having associated therewith the stored content identifier and the authorization token,
obtain a content identifier and a link authorization token from the content display server based upon a request to display the targeted content via the deep-link, the request to display the targeted content including the content identifier and the link authorization token, and
determine whether the obtained link authorization token is valid based upon the generated authorization token and determine whether the received content identifier matches the stored content identifier, and when so, cause the content display server to modify a layout of content for display on the end-user device so that targeted content is displayed above other content, otherwise, cause the content display server to display the content on the end-user device without modification to the layout of content.

11. The deep-link server of claim 10 wherein the targeted content comprises a digital promotion and wherein the content identifier comprises a digital promotion identifier.

12. The deep-link server of claim 11 wherein the targeted content is associated with a given brand; and wherein the digital promotion is redeemable toward purchase of a product of the given brand.

13. The deep-link server of claim 10 wherein the targeted content is in the form of one of an email and short-message-service (SMS) message.

14. The deep-link server of claim 10 wherein the processor is configured to, when the link authorization token is valid and the received content identifier matches the stored content identifier, cause the content display server to modify a layout of content for display so that targeted content is displayed on top of other content.

15. The deep-link server of claim 10 wherein the authorization token has a valid time associated therewith; and wherein the processor is configured to determine the link authorization token is valid by determining whether the valid time has expired.

16. A method of deep-linking for a deep-linking authentication system comprising a content origination server configured to generate targeted content having a stored content identifier associated therewith, and a content display server configured to cooperate with an end-user device to display the targeted content, the method comprising:
using a deep-link server to
obtain the stored content identifier from the content origination server,
generate an authorization token based upon the stored content identifier,
communicate the authorization token to the content origination server so that the content origination server generates a deep-link to the targeted content on the content display server, the deep-link having associated therewith the stored content identifier and the authorization token,
obtain a content identifier and a link authorization token from the content display server based upon a request to display the targeted content via the deep-link, the request to display the targeted content including the content identifier and the link authorization token, and
determine whether the obtained link authorization token is valid based upon the generated authorization token and determine whether the received content identifier matches the stored content identifier, and when so, cause the content display server to modify a layout of content for display on the end-user device so that targeted content is displayed above other content, otherwise, cause the content display server to display the content on the end-user device without modification to the layout of content.

17. The method of claim 16 wherein the targeted content comprises a digital promotion and wherein the content identifier comprises a digital promotion identifier.

18. The method of claim 17 wherein the targeted content is associated with a given brand; and wherein the digital promotion is redeemable toward purchase of a product of the given brand.

19. The method of claim 16 wherein using the deep-link server comprises using the deep-link server to, when the link authorization token is valid and the received content identifier matches the stored content identifier, cause the content display server to modify a layout of content for display so that targeted content is displayed on top of other content.

20. The method of claim 16 wherein the authorization token has a valid time associated therewith; and wherein using the deep-link server comprises using the deep-link server to determine the link authorization token is valid by determining whether the valid time has expired.

21. A non-transitory computer readable medium for deep-linking in a deep-linking authentication system comprising a content origination server configured to generate targeted content having a stored content identifier associated therewith, and a content display server configured to cooperate with an end-user device to display the targeted content, the non-transitory computer readable medium comprising computer executable instructions that when executed by a processor of a deep-link server of the deep-linking authentication system cause the processor to perform operations comprising:
obtaining the stored content identifier from the content origination server;
generating an authorization token based upon the stored content identifier;
communicating the authorization token to the content origination server so that the content origination server generates a deep-link to the targeted content on the content display server, the deep-link having associated therewith the stored content identifier and the authorization token;
obtaining a content identifier and a link authorization token from the content display server based upon a request to display the targeted content via the deep-link, the request to display the targeted content including the content identifier and the link authorization token; and
determining whether the obtained link authorization token is valid based upon the generated authorization token and determining whether the received content identifier matches the stored content identifier, and when so, causing the content display server to modify a layout of content for display on the end-user device so that targeted content is displayed above other content, otherwise, causing the content display server to display the content on the end-user device without modification to the layout of content.

22. The non-transitory computer readable medium of claim 21 wherein the targeted content comprises a digital promotion and wherein the content identifier comprises a digital promotion identifier.

23. The non-transitory computer readable medium of claim 21 wherein the operations comprise, when the link authorization token is valid and the received content identifier matches the stored content identifier, causing the content display server to modify a layout of content for display so that targeted content is displayed on top of other content.

24. The non-transitory computer readable medium of claim 21 wherein the authorization token has a valid time associated therewith; and wherein the operations comprise determining the link authorization token is valid by determining whether the valid time has expired.

\* \* \* \* \*